Feb. 23, 1971     R. B. HOLIMAN     3,564,751
COLLAPSIBLE FISHING GEAR WITH RODS AS HANDLES
OF TONGS-TYPE ATTACHMENT
Filed July 22, 1969

INVENTOR.
Raymond B. Holiman
BY
Ralph G. Pittman
Agent

United States Patent Office 3,564,751
Patented Feb. 23, 1971

3,564,751
COLLAPSIBLE FISHING GEAR WITH RODS AS HANDLES OF TONGS-TYPE ATTACHMENT
Raymond B. Holiman, 323 Rose St.,
Little Rock, Ark. 72205
Filed July 22, 1969, Ser. No. 843,551
Int. Cl. A01k 97/10
U.S. Cl. 43—21.2      11 Claims

ABSTRACT OF THE DISCLOSURE

A fishing gear suitable for automatic operation is in the form of a spring-driven tongs-type clamp suitable for removably attaching the gear to a wood member which extends upwardly above water. The jaws of the clamp are continuously biased to the closed position, and actuated to an open position by movement of a pair of associated fishing rods which serve as handles. A pivotal mounting of the rods permits selective circumferential positions of attached fishing lines. The gear can be compactly folded for carrying and stowing.

PRIOR ART

A large number of prior art constructions disclose multiple fishing rods extending outwardly from some sort of holders or clamping devices, the latter being generally attached either to a part of a boat or to a stake driven into the bank near the edge of the water. There appears no suggestion of any fishing gear capable of utilizing a pair of fishing rods as handles for manipulating the spring-loaded jaws of a tongs-type clamp during the process of mounting the gear on, for example, a tree trunk projecting above the water line. Additionally, there appears no suggestion of any construction in which these jaw and handle components are so related as to constitute a collapsible combination.

BACKGROUND

Timber growth is prevalent along the banks of many streams, and particularly along the shore lines of man-made lakes. While the line-snagging problem discourages casting in these brushy locations, it is well known that they are attractive sites for food fish population, and well recognized as favorable fishing spots among fishermen.

OBJECTIVES

An objective of the invention is the provision of a fishing gear adapted for clamping to a timber member, characterized by the utilization of the associated fishing rod as handles to enable the clamping operation to be effected.

Among other objects are the provision of (a) fishing gear embodying spring-biased serrated clasping jaws suitable for clamping to upstanding members which differ in size; (b) a fishing apparatus which includes retaining means encompassing the support to which it is attached to preclude detachment of the apparatus by a hooked fish; (c) an apparatus in which the fishing rods are capable of adjustment to a plurality of optional outstanding positions and (d) a fishing gear foldable to a compact size for carrying and storing.

DRAWING

PREFERRED EMBODIMENT

Figure 1:
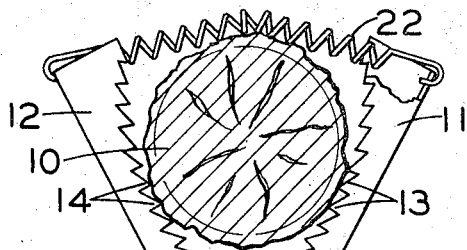
FIG. 1 is a plan view of the invention, partly in section, an alternate position of each of the fishing rods being indicated.
Figure 2:
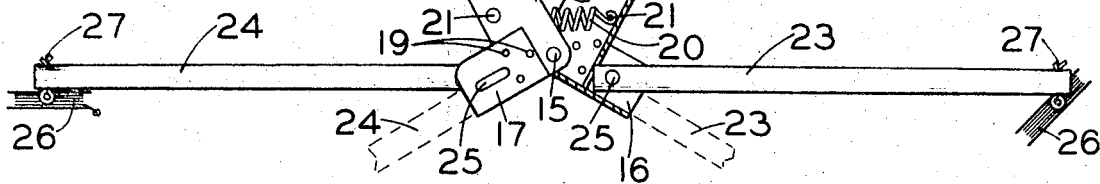
FIG. 2 is an elevational view, showing more clearly the embodied fishing lines and automatic reels.
Figure 4:
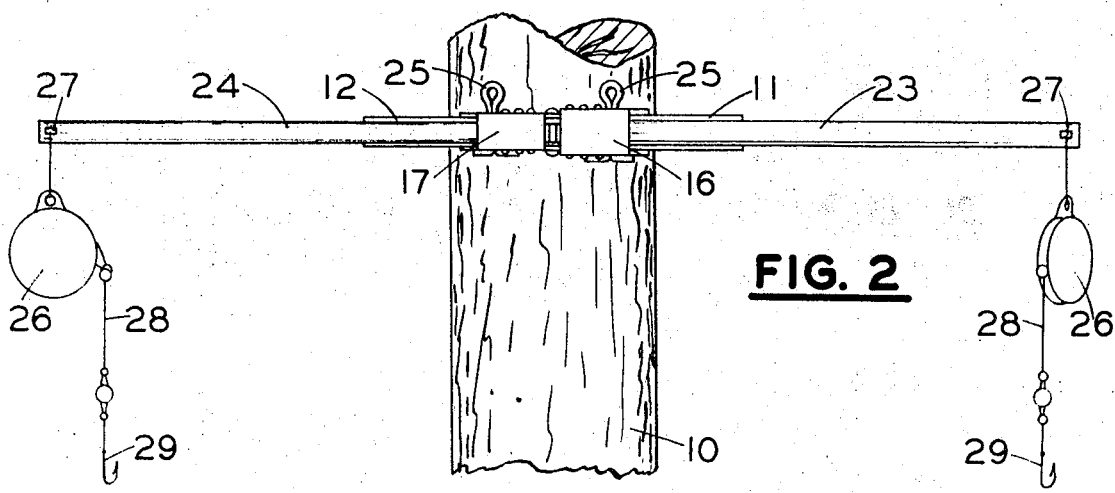
FIG. 4 is a fragmentary end view of the gear when folded, the fishing lines and reels being omitted.
Figure 4:
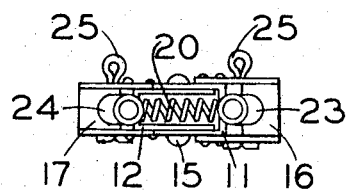

FIGS. 1 and 2 illustrate the fishing gear in a service position, here shown fastened to the upstanding wood member 10 by (1) the engagement therewith of the serrations 13 and 14 of the arcuately contoured, opposingly disposed jaws 11 and 12 and (2) the engagement therewith of the tensioned retaining spring 22, which is removably hooked to and removably spans the forwardly directed ends of the jaws.

Figure 3:
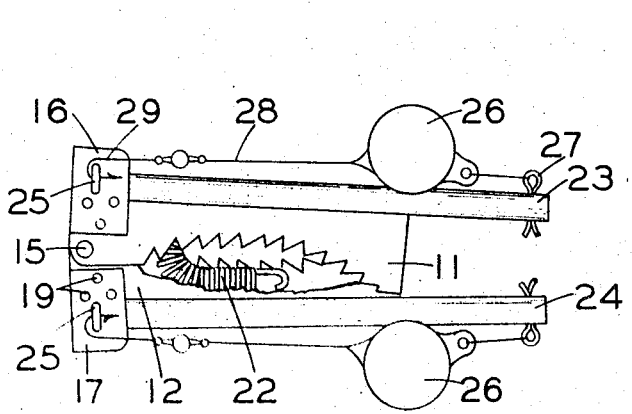
FIG. 3 is a plan view of the gear with the components in the collapsed position for packing and carrying, a portion of one jaw being broken away.

The rearward pair of ends of the jaws 11 and 12 are pivotally joined by the pivot pin 15 passing therethrough, and a spring 20 continually urges the jaws toward the closed position, being attached to the jaws adjacent the pivot pin 15 and hooked at its ends on the spring pins 21. The jaws 11 and 12 are preferably formed from flat steel sheet, in the shape of channels, with the facing clasping contours coextensive with the marginal edges of the spaced flanges of the channels. The relative width of the channels and their articulation is such that one telescopes into the other to provide a hollow housing when the jaws are in the closed position, as shown in FIG. 3.

A pair of metal clip channels 16 and 17 overlap the respective rearward and hinged ends of the jaws 11 and 12, being rigidly secured thereto by the rivets 19. Each of the clip channels has a portion extending perpendicularly outward from its associated jaw, and a pair of tubular metal fishing rods 23 and 24 project therein, the inwardly directed end of each rod being pivotally mounted for limited unimpeded swingable movement on its associated bracket by the cotter pins 25.

An automatic fishing reel 26, along with its associated line 28 and hook 29, is secured to the respective outer ends of the fishing rods 23 and 24 at the fastener 27. As may be seen from FIG. 1, each of the rods may be positioned as may be desired between the limits indicated by the dash lines and the web of the channel-shaped jaws— an optional range of about 90 degrees. This range of fishing rod position enables the selection of an unobstructed location into which the fish hooks may be lowered.

To remove the fishing gear, the retaining spring 22 is first detached at its ends from the jaws. The fishing rods are then manually moved convergently with respect to one another, causing the inwardly projecting end of each rod to engage an adjacent rearward end portion of the associated jaw and thereby swing each jaw about the pivot 15, divergently with respect to one another and thus to a more open position.

Following removal from the support, the gear may be collapsed to the form shown by FIG. 3. The retaining spring 22 is conveniently stored within the housing formed by the closed jaws; the fishing rods are folded alongside the respective webs of the channel-shaped jaws; and the fishing hooks hooked to the eyes of the cotter pins 25, the slack in each line being taken up in its cooperating reel.

To reset the gear, the fishing rods are again utilized in cooperation with the jaws to constitute a tongs-type, spring driven clamping device, the fishing rods functioning as manipulating handles.

The teeth or serrations along the concave marginal facing edges of the grasping jaws are preferably formed with sharp points for entering the bark of a timber member, and inclined toward the hinged ends of the jaws when the jaws are in the closed position. This form of concave clasping contour maintains the surface-engaged teeth in effective clasping contact with a rough wood bark, and enables dependable attachment of the fishing gear to upstanding members from one inch diameter to eleven inches diameter while limiting the jaw length to less than nine inches.

Since the automatic reels are actuated to wind in the line in response to an outward pull, a group of these fishing gears may be conveniently set with baited hooks along a timbered shore line, and the fish removed at the fisherman's convenience after they have been drawn out of the water by the reels.

I claim as my invention:

1. A collapsible fishing gear adapted for removable mounting on an upstanding wood member comprising a tongs-type attachment having a pair of opposingly disposed jaws formed with facing generally arcuate clasping contours, hinge means joining one pair of the adjacent ends of said jaws about which said jaws are swingably movable between a plurality of open positions and a closed position, biasing resilient means transversely connecting said jaws adjacent their hinged ends and continuously urging said jaws to the closed position, and a fishing rod secured at the hinged end of each jaw and extending outwardly therefrom, the fishing rods cooperating with said jaws to swingably actuate said jaws to an open position concurrently with a predetermined swingable movement of the fishing rods.

2. The fishing gear as defined in claim 1, wherein said fishing rods are articulated with respect to said jaws to effect a divergent movement therebetween concurrently with a convergent movement of said fishing rods.

3. The fishing gear as claimed in claim 1, including a retaining helical spring removably connected to the respective unhinged ends of said jaws and cooperating therewith to claspingly enclose an upwardly extending wood member between said jaws and said retaining spring.

4. The fishing gear according to claim 1, in which the jaws are in the form of sheet metal strips channel-shaped in section and the facing clasping contours of the jaws are coextensive with the spaced flanges of the channels.

5. The fishing gear in accordance with claim 4, wherein one of said jaws is telescopically related to the other of said jaws when the gear is folded to the collapsed position.

6. The fishing gear as defined in claim 5, in which the telescoped channel-shaped jaws cooperate to constitute a housing for storing a removable portion of the fishing gear.

7. The fishing gear as claimed in claim 4, wherein the marginal edges of each of the flanges of each of said channels are serrated along the clasping contours.

8. The fishing gear in accordance with claim 7, in which the serrations are inclined inwardly toward the hinged ends of said jaws.

9. The fishing gear according to claim 1, wherein each of the fishing rods is pivotally mounted at its inner end and swingably movable about its pivotable mounting to any one of a plurality of positions including a folded position alongside its respective associated jaw.

10. The fishing gear as claimed in claim 9, wherein each pivotal mounting includes a cotter pin as the pivot thereof and a fishing line is fixedly secured to the outer end of each rod, said fishing line having a fish hook at the outer end of said line removably hooked to the eye of the cotter pin when said gear is in the collapsed position.

11. In a fishing gear having at least two fishing rods removably clamped to an upstanding support and extending outwardly therefrom, the improvement wherein the clamping means comprises a pair of forwardly directed curved and toothed channel-shaped grasping jaws hinged to one another at their respective rearward ends and continuously biased from an open position to the closed position by a tensioned spring connecting the jaws near the rearward ends, jointure means pivotally mounting each of said fishing rods at a respective rearward end of each of said jaws, said jointure means including a pair of outwardly directed clip channel brackets overlapping respective rearward end portions of each of said jaws and rigidly secured thereto, the inner end portions of said fishing rods being respectively disposed in the outwardly directed portion of the associated bracket, a pivot joining each fishing rod to the associated bracket for swingable movement therefrom, said pivot passing through the associated rod adjacent its inner end and the latter moving about said pivot to abut an adjacent rearward end portion of the associated jaw in response to a predetermined swingable movement of said fishing rods in the direction one toward the other to thereby actuate said jaws to the open position against the bias of said tensioned spring.

References Cited
UNITED STATES PATENTS

| | | | |
|---|---|---|---|
| 952,812 | 3/1910 | Jorgensen | 43—21.2 |
| 1,719,695 | 7/1929 | Ferguson | 43—21.2X |
| 2,196,472 | 4/1940 | Moriarty | 43—21.2 |
| 2,621,877 | 12/1952 | Grigsby | 43—21.2 |

WARNER H. CAMP, Primary Examiner